United States Patent [19]
Mueller

[11] 4,369,434
[45] Jan. 18, 1983

[54] ENCIPHERING/DECIPHERING SYSTEM
[75] Inventor: Kurt H. Mueller, Wallisellen, Switzerland
[73] Assignee: Gretag Aktiengesellschaft, Regensdorf, Switzerland
[21] Appl. No.: 215,493
[22] Filed: Dec. 11, 1980
[30] Foreign Application Priority Data
Dec. 20, 1979 [CH] Switzerland .............. 11319/79
[51] Int. Cl.³ .................................. H03K 13/00
[52] U.S. Cl. ................. 340/347 DD; 178/27.05; 178/22.06
[58] Field of Search .......... 364/717; 178/22.05, 178/22.06, 22.07, 22.08, 22.09, 22.19; 179/1.5 E, 1.5 S; 340/347 DD

[56] References Cited
U.S. PATENT DOCUMENTS

| | | | |
|---|---|---|---|
| 3,796,830 | 3/1974 | Smith | 178/22.06 |
| 3,798,360 | 3/1974 | Feistel | 178/22.05 |
| 3,958,081 | 5/1976 | Ehrsam | 178/22.05 |
| 4,211,891 | 7/1980 | Glitz | 178/22.19 |
| 4,281,215 | 7/1981 | Atalla | 178/22.08 |

*Primary Examiner*—C. D. Miller
*Attorney, Agent, or Firm*—Burns, Doane, Swecker & Mathis

[57] ABSTRACT

The enciphering section of an enciphering/deciphering system includes a random number generator, a primary code memory and a multiplex unit in addition to the actual enciphering unit. The deciphering section includes a deciphering unit, a primary code memory and a demultiplex unit. At the beginning of each transmission, and after disturbances, the enciphering and deciphering sections are first synchronized by means of a synchronization sequence. Then a random address is produced by the random number generator for a primary code, and a randomly determined auxiliary code is also selected. The address and the auxiliary code are then transmitted and the primary and auxiliary codes are loaded into the enciphering and deciphering units. The randomly controlled, statistical selection of the primary code simplifies the code management and thus the operation of the system.

5 Claims, 7 Drawing Figures

| PK \ AK | NUMBER (ADRESS) OF PRIMARY KEY PK·(KA) | | | | | | | | |
|---|---|---|---|---|---|---|---|---|---|
| 1 | 3 | 4 | 5 | 6 | 7 | 0 | 1 | 2 | NO ERROR |
| 2 | 7 | 0 | 1 | 2 | 3 | 4 | 5 | 6 | |
| 3 | 4 | 5 | ⊗ | | | | | | |
| 4 | 1 | 2 | 3 | 4 | 5 | 6 | 7 | 0 | NO ERROR |
| 5 | 2 | 3 | 4 | 5 | ⊗ | | | | |
| 6 | 6 | 7 | 0 | 1 | 2 | 3 | 4 | 5 | NO ERROR |
| 7 | 5 | 6 | 7 | 0 | ........ | | | | |

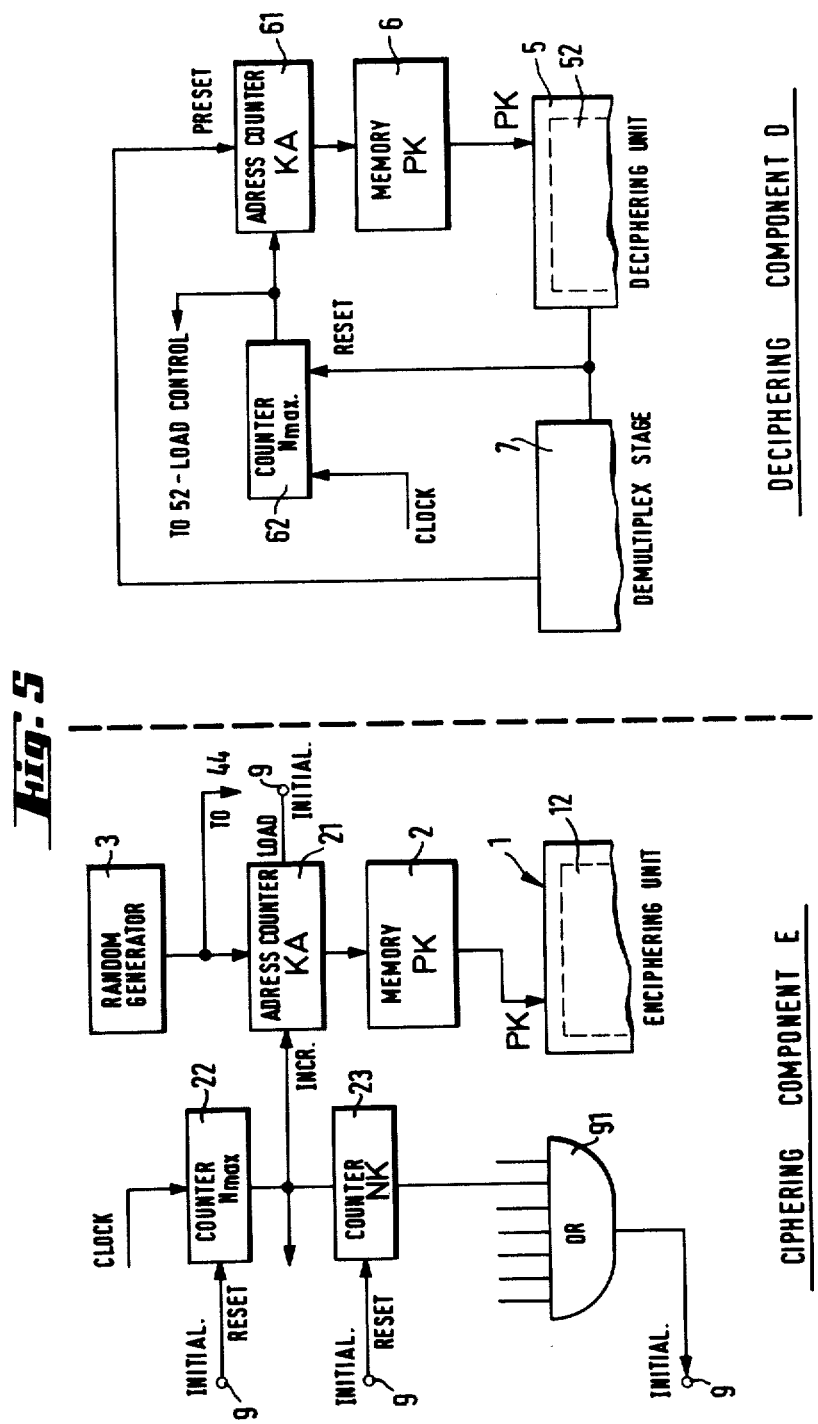

4,369,434

ENCIPHERING/DECIPHERING SYSTEM

BACKGROUND OF THE INVENTION

The present invention relates to an enciphering/deciphering system for transforming data into an encoded message before transmission thereof and for transforming a received message back into unscrambled data.

For example, the enciphering/deciphering systems GC-201, GC-505 and GC-515 of the company Gretag AG, Regensdorf, Switzerland are typical representatives of such enciphering/deciphering systems. These systems contain an enciphering/deciphering generator as a principal item, whose structure and initial states are determined, among other things, by a primary key, or code, and a non-secret, randomly determined auxiliary code. With each new initialization of the system (first transmission reception, resumption after disruption, etc.), a new randomly determined auxiliary code is automatically generated, transmitted and loaded into the enciphering/deciphering generators on the transmission and reception ends of the system. On the other hand, as a general rule, the secret primary code is changed only after relatively long time intervals.

In the case of older systems, the primary code change takes place by means of direct input of the new code into the generator with a keyboard or the like. The above-named GC-505 and GC-515 systems have a memory on the transmitting and receiving ends, in which a number (e.g. 30) of identical transmission and reception side secret primary codes are kept available. To change the primary code, in the case of the GC-515 system, the memory address or the number of the desired code need be put in only at each station via a selection switch or the like, and the charging or loading of the code into the encipher generator then takes place automatically. Code changes (e.g. to the next highest code number) are undertaken after certain time intervals agreed upon between the partner stations. In the case of the GC-505 system, it is sufficient to select the code address at the calling station, after which it is transmitted automatically to the partner station.

In the case of ciphered transmission, for reasons of safety, it is known that the amount of data (i.e. number of bits) transmitted for a certain code setting must be limited. An upper limit is given by the structure-caused recursion length of the cipher generators to be used. The maximum recursion time, during which one may work with an unchanged code setting, depends on this recursion length and is naturally inversely proportional to the transmission rate. For example, a weekly change of the primary code is recommended for the above-named GC-515 system at a transmission rate of 19.2 kb/s. Since the code memory of the GC-515 system contains a total of 30 codes, the memory would have to be replaced every six to seven months if the system is operated continuously. This relatively frequent changing of the primary code and the frequent replacement of the code memory cause an undesirable administrative and personnel effort which, following the trend to higher transmission rates, may become greater in the future.

OBJECT AND BRIEF SUMMARY OF THE INVENTION

It is thus the object of the invention to provide an improved enciphering/deciphering system of the type defined previously such that its operation relating to selection and change of the ciphering codes is simplified as much as possible and is done completely automatically.

In a system according to the invention, the primary code is selected by a random address produced by a random number generator, which preferably is the one present for producing the auxiliary code, instead of by an intentional, manual selection of a code address or number (as for example with the aforementioned equipment). All code addresses are equally probable, so that a statistically relatively well-equalized operating time of each individual primary code is guaranteed over a long period of time. In particular, with limited or sporadic operation of the system, the degree of freedom of the code memory is cryptologically better utilized by the frequent, statistical change of the primary code. The automatic change of code simplifies the code management and allows the ciphering equipment practically to become a "black box" type of unit not requiring operator input. Finally, the ciphering equipment becomes cheaper by elimination of manual code selection and the operating elements required for it.

BRIEF DESCRIPTION OF THE DRAWINGS

FIGS. 5 and 6 are block diagrams of two other embodiments of the present invention.

DETAILED DESCRIPTION

Figure 1:
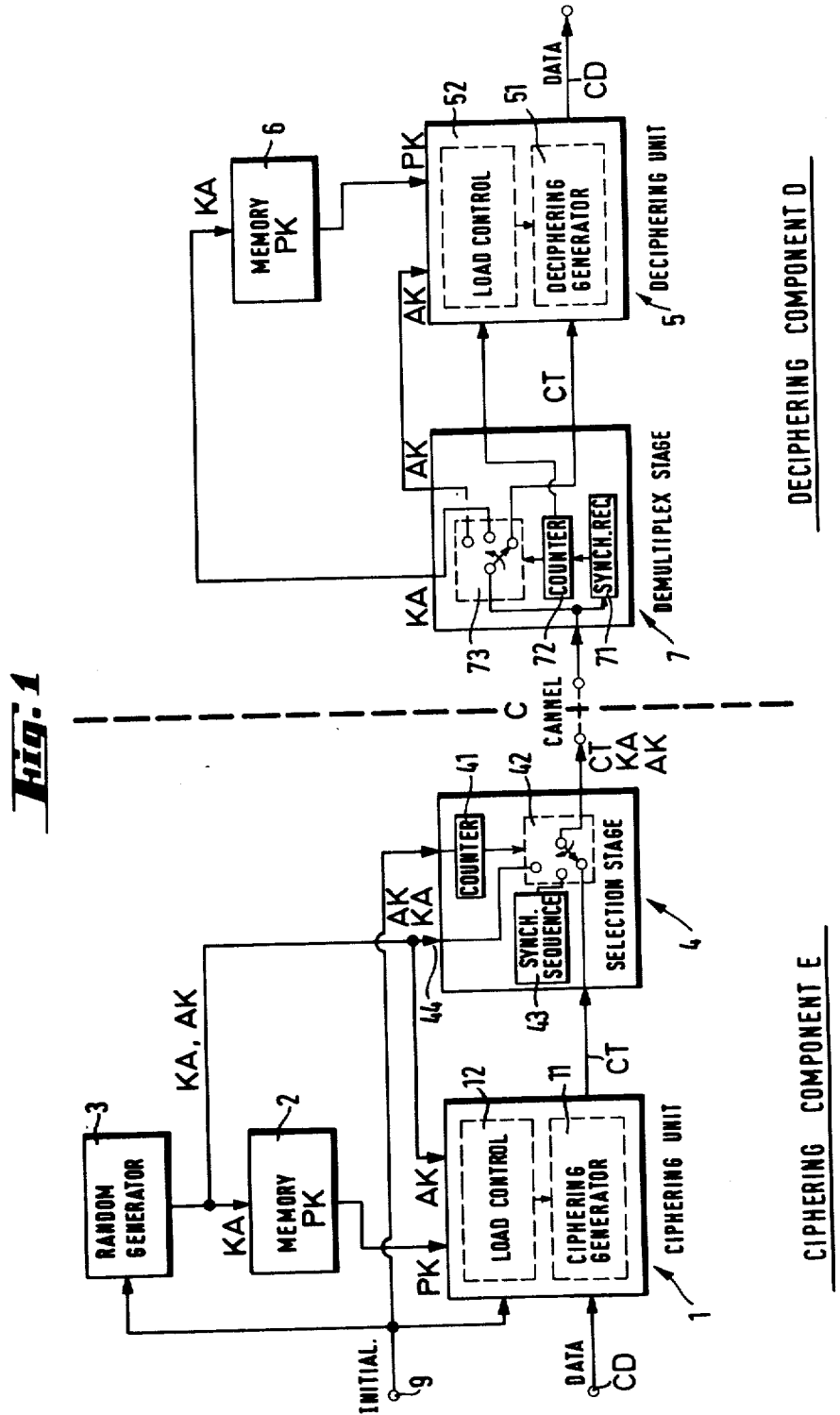
FIG. 1 is a block diagram of a first embodiment of the present invention.

The enciphering/deciphering system shown in FIG. 1 consists of an enciphering section E and a deciphering section D, which are connected to each other by a data connection designated in general as a channel C.

The enciphering section E essentially contains an enciphering generator 11 and a load control 12 which are part of the enciphering unit 1, a primary code memory 2, a random number generator 3 and a multiplex unit 4. In a similar manner, the deciphering section D includes a deciphering unit 5 with a deciphering generator 51 and a load control 52, a primary code memory 6 and a demultiplex unit 7.

The multiplex unit 4 includes a counter 41, a switch 42 controlled by the counter, and a memory 43 storing a synchronizing sequence. Instead of the memory, of course a corresponding generator which generates the synchronizing sequence on request can be provided.

Analogous to the multiplex unit 4, the demultiplex unit includes a detection stage 71 for recognizing the synchronizing sequence, a counter 72 and a switch 73 controlled by the counter 72.

The design of the enciphering/deciphering system shown in FIG. 1 corresponds to the ciphering systems GC-505 and GC-515 of the company Gretag AG, Regensdorf, Switzerland, named above, except for a few essential special features. These ciphering systems have been sold world-wide for several years, so that their conception and their method of operation are known to the experts. The present description is thus limited to the essentials for an understanding of the invention, whereby everything which is not specially explained is to be assumed functionally similar to the two aforementioned ciphering systems.

The general functioning method of the described system is as follows. To make a connection, an initializing command is first given over an input terminal 9 present on the enciphering section E. The initializing cycle is commenced by this command, wherein the enciphering and the deciphering sections are synchronized by means of the synchronizing sequence. An auxiliary code AK is produced by the random number generator 3, transmitted and read into the enciphering and deciphering generators. Furthermore a random selection address $KA_j$ is generated by the random number generator 3 for the primary code $PK_j$ stored in the code memory 2; the address is transmitted and the corresponding primary code $PK_j$ is read into the enciphering and deciphering generators.

This initializing cycle takes place the same as in the case of the previously described known ciphering systems GC-505 and GC-515, with the only exception, forming the main part of the invention, that the selection of the primary code is controlled by the random number generator 3, rather than by hand. In terms of switching technology, this is accomplished by the fact that the input terminal 44 of the multiplex unit 4 and the address input terminal of the memory 2 are connected with the random number generator 3, rather than a manual input mechanism.

Figure 2:
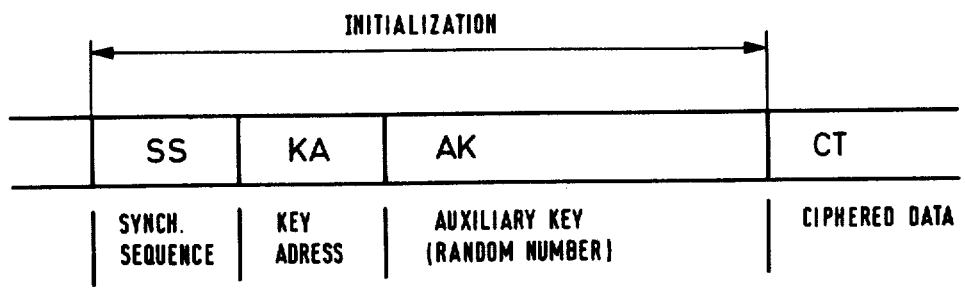
FIGS. 2-4 are graphical sketches for facilitating an explanation of the method of operation of the present invention.

The initializing cycle is illustrated in FIG. 2. First, the synchronizing sequence SS, then the address $KA_j$ for the actual primary code $PK_j$, and finally the randomly determined auxiliary code AK are transmitted. The two latter signals naturally could be reversed in sequence, or the address could be contained in the auxiliary code in some kind of form. The counters 41 and 72 (the latter after reset by the detection stage 71) monitor the just transmitted information (synchronization sequence, code address etc.) and when reaching the given length (number of bits) of this information, cause a switching of the switches 42 and 73 into the switch positions corresponding to the correct data flow, as well as actuation of the load control 52 in the deciphering section and the loading of codes PK and AK into the deciphering generator 51.

After concluding the initializing cycle, the enciphering and deciphering generators are synchronized and loaded with the same primary and auxiliary codes $PK_j$ and AK. The switches 42 and 73 are located again in their initial positions indicated in FIG. 1. Now, unscrambled data CD is fed to the enciphering unit 1, and enciphered in a known way. The resulting coded data CT is then transmitted, via the multiplex unit 4, channel C and the demultiplex unit, to the deciphering unit 5 and is then transformed there back into the original unscrambled data CD.

The primary code $PK_j$ which is used is randomly selected by the random number generator 3 upon each new initialization. The random number generator can have a separate output terminal for the address information, but it is also conceivable to randomly derive the address information directly from the auxiliary code which is present anyway, e.g. perhaps by means of a polynomial factor.

The address of the randomly selected primary code, which, for example, is selected by the calling station, is clearly transmitted to the receiver, preferably with the use of error-correcting or error-recognizing codes.

Each address is equally probable in the random selection of the primary code from the stored supply. A "bookkeeping" type of operation is thus not necessary to avoid repeated calling of the same code.

In a practical example, the code memory, e.g., can store 256 different codes of 64 bits each. Such a memory can be realized in a single integrated programmable read only memory (PROM). In the case of five year operation of the system, each code would be used for one week on the average. In the case of new initializing in intervals of 5-6 hours on the average, each code would be used on the average of about 32 times during the five year operating time, which should provide a relatively good statistical equalization of the operating times for the individual codes.

A new initialization of the system, and thus a change of the primary code (and in the given case also the auxiliary code), is generally undertaken in the case of network interruption, interruption of conduction, activation of a self test, loss of a byte cycle and change of the transmission direction. A new primary code can furthermore be used when a given maximum amount of data $N_{max}$ is processed. Advantageously, the maximum amount of data amounts to only a fraction of the recursion length of the enciphering generator and is furthermore small enough to allow one to expect a statistically equalized mixing of all codes during the intended operating time of the code memory.

Figure 3:
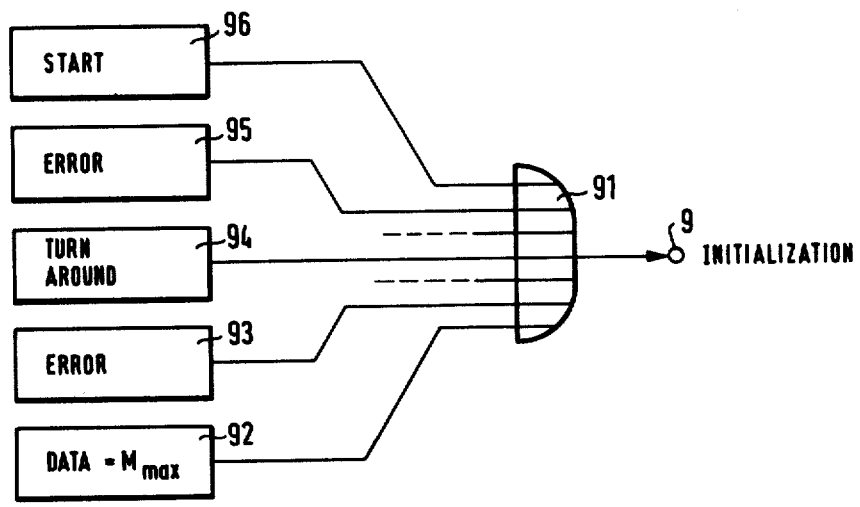

The events leading to a new initialization are summarized in FIG. 3. The small boxes 92-96 symbolize sensors or detectors for the concerned events, whereby the small boxes 93 and 95 respond to all possible disturbances. The output signals of the event sensors are combined in an OR-gate 91, which is connected with the initializing input terminal 9 of the enciphering section 1, so that an initializing is triggered with the actuation of some of the sensors.

It will be appreciated that the representation according to FIG. 3 is purely symbolic and in reality of course other events can be provided for.

On the whole, the entire ciphering system is advantageously realized in the form of a micro-computer system, in which the individual operations and data flow take place in a program-controlled manner.

For reasons of speed or for other reasons, individual components, as for example parts of the enciphering generator, etc., can naturally be implemented with hardware. The present description and the figures are intended to explain only the functional elements essential for the invention, and it makes no difference whether these groups are implemented by specific hardware or by means of software in a micro-computer system. The previously described GC-505 system is one example of a ciphering system implemented by a micro-computer system.

Figures 4, 7:
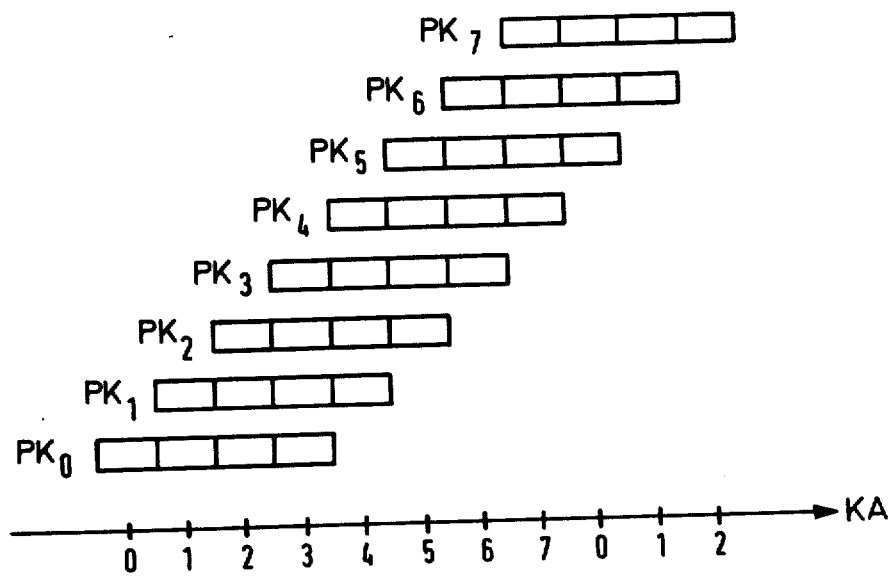
FIG. 7 is another graphical sketch for providing a functional explanation of the invention.

Instead of changing the primary code PK only upon a new initialization, the code change can also be undertaken according to the following principle illustrated by the example of FIG. 4. At the beginning of transmission, a new initialization takes place, whereby a first randomly determined auxiliary code AK 1 and a first, randomly selected primary code are produced and read out of the memory 2. It is assumed in FIG. 4 that a supply of eight primary codes, which are numbered from 0-7, is stored in the memory. The first selected primary code is denoted in this example by the number 3. Enciphering and deciphering are now carried out with this code setting, AK 1-PK 3. After processing a given maximum amount of data $N_{max}$, which naturally depends on the recursion length of the enciphering generator, a new primary code is selected with the auxiliary code AK 1 remaining the same, and the primary code portion of the code setting is adjusted. For purposes of simplicity, as a rule the new primary code is the same as the code with the next following memory address, in the present example therefore the primary code is No. 4. With this new code combination AK 1-PK 4, operation is carried out, assuming disturbance-free operation, until the maximum amount of data $N_{max}$ is processed. Then the following primary code is selected and so on, until all the codes (in the present example eight) in the memory have been used. Thereafter, a new initializing takes place automatically with the generation of a new, random auxiliary code AK 2 and a new starting address, for example No. 7, for the primary code PK.

The operation proceeds in this manner until some event occurs which forces a new initialization. In FIG. 4, these events are designated by the symbol $\otimes$. After initialization has taken place, the operation continues in the above-described manner, as can be recognized from FIG. 4.

The previously described procedure has the advantage that a code change can be undertaken without interrupting the data transmission after processing the maximum given amount of data, $N_{max}$, since the simple incrementing of the storage addresses for the code address need not be transmitted.

The length $N_{max}$ of the maximum data amount of course need not necessarily be constant. For example, the primary code change could also take place according to the particular data package. Another possibility would be to undertake the code change, that is to say the incrementing of the primary code addresses, in secret, possibly pseudo-randomly determined, time intervals.

A circuit which practically realizes the code change scheme described with respect to FIG. 4 is illustrated in FIG. 5, whereby only the elements necessary for an understanding of this embodiment are represented and the remainder is as shown in FIG. 1. In this embodiment of the ciphering system according to the invention, the individual function groups are preferably realized by a micro-computer system.

In addition to the elements shown in FIG. 1, the transmission end of the system shown in FIG. 5 includes an address register 21 for the memory 2, a counter 22 for the determination of the processed data, and a code counter 23. The reception end of the system includes an address register 61 and a data counter 62.

Upon a new initialization, all counters are reset and the first random address KA for the primary code is loaded into the address register 21, and processing of the data begins. As soon as the data counter 22 reaches a predetermined number $N_{max}$, the address register 21 and the code counter 23 are incremented, and a new primary code is read into the enciphering generator. Logically, the same occurs in the diciphering section. When the code counter 23 reaches the count NK corresponding to the number of primary codes PK present in memory 2, it causes a new initialization over the OR-gate 91 and the input terminal 9 and so on.

The code change principle described up to now can be generalized in the sense of better memory utilization. Instead of subdividing the given memory capacity $N \times M$ of the primary code memory into N independent codes of M bits each, a much greater number of codes can be housed in the memory when each code consists of a specified arrangement of M of the total $M \times N$ information elements. In the most extreme case, where each of the M code bits per code would be determined by a random address, $(M \times N)^M$ different code combinations would be possible, whereby naturally only $2^M$ codes would be mutually distinguishable. Such selected primary codes would have practically ideal random character, but the statistical use of the secret elements would be insufficient and the address information to be transmitted would be too long for practical purposes.

A practically more attractive solution is the counting off of M code bits to a bit selected randomly from the total of $M \times N$ bits. Now, instead of N, we have $M \times N$ codes, whereby additional code pairs $PK_{j-\mu}$ and $PK_{j+\mu}$ exist for each code $PK_j$, which $PK_j$ overlap ($1 \leq \mu \leq M-1$) by $M-\mu$ bits. Not all $M \times N$ codes are absolutely different, but the degree of difference is sufficiently great without subjecting the memory content to special limitations.

FIG. 7 illustrates this type of code organization in the memory 2 or 6 for $N=2$ and $M=4$. As can be recognized, eight different codes are possible with the starting addresses 0-7, whereby neighboring codes actually mutually overlap by 3 bits.

The mutual overlapping of the primary codes PK can be kept small, if so desired. This can be achieved, for example, by selecting shorter starting addresses, which define groups of bits instead of individual bits. As an example, one can imagine the arrangement shown in FIG. 7 as bytes instead of bits. A byte-addressing as the smallest unit is especially favorable in terms of software and hardware economy with most micro-computer systems.

For example, the following possibilities exist with a fixed value memory (e.g. PROM) of $2048 \times 8$ bits memory capacity, with a code length of $M=64$ bits:

| Overlapping (bit) | Number of Codes | Address Extent (bit) |
|---|---|---|
| 0 | 256 | 8 |
| 32 | 512 | 9 |
| 48 | 1024 | 10 |
| 56 | 2048 | 11 |

Figure 6:
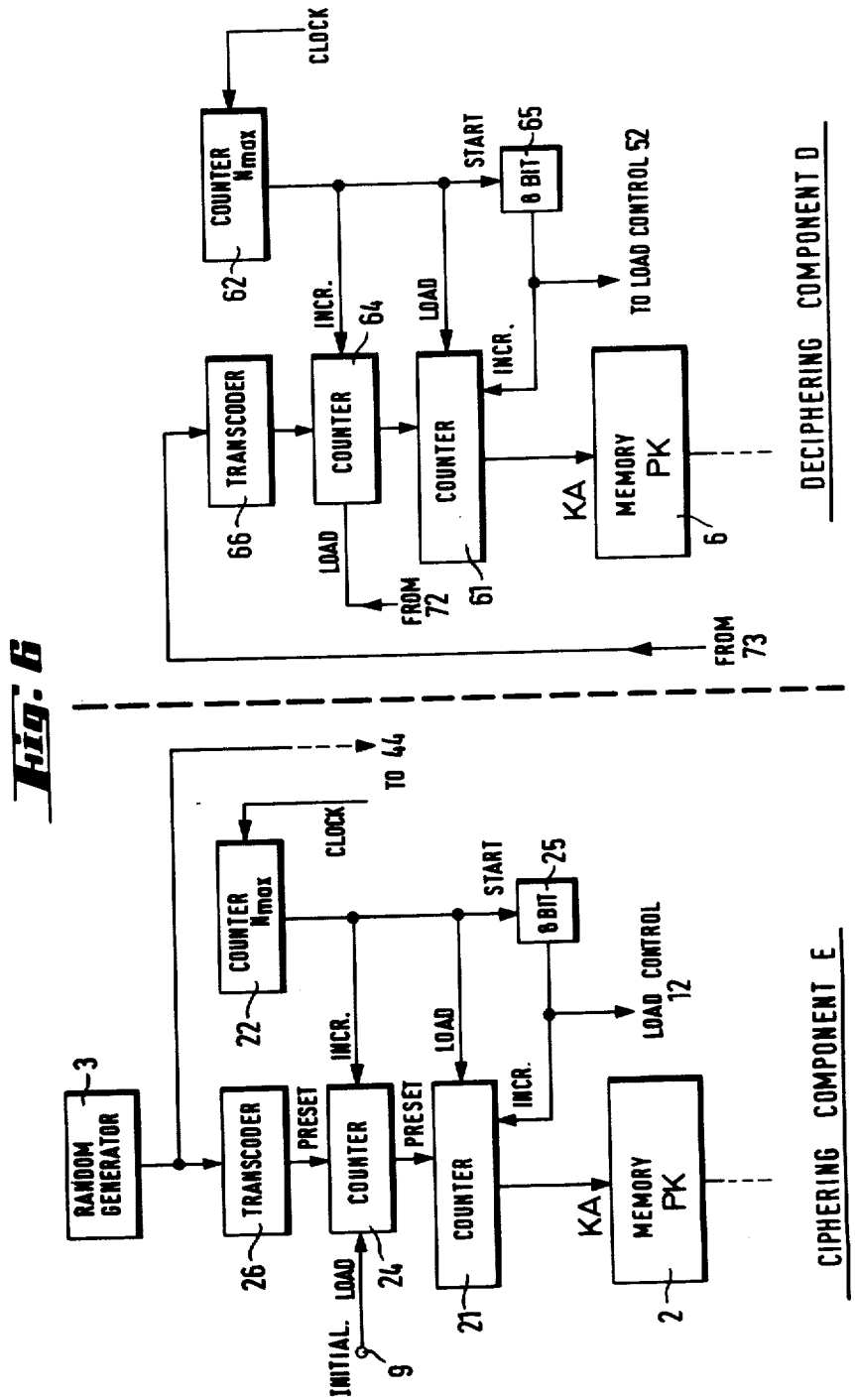

FIG. 6 illustrates an embodiment of a ciphering system which is arranged for this type of code organization. It has overlapping codes. A distinction is made as compared with the embodiment according to FIG. 5, only by an additional address register 24 and 64 and an pulse generator 25 or 65. Furthermore, a transcoder 26 or 66 is provided, which in itself does not affect the code organization, and in the following description will not be considered.

The primary code memories 2 and 6, for example have a format of $2048 \times 8$ bits and therefore need an 11-bit address for the addressing of a byte. Each primary code may include 64 bits.

Upon initialization, an 8-bit address formed by the random number generator 3 is first read into the second address registers 24 or 64. At the same time, the eight higher value bits of this address information are included with the 8-bit address and loaded into the first address register 21 or 61. Now, the pulse generators 25 and 65 generate a sequence of eight cycle pulses, which increment the first address registers eight times. After this, eight successive bytes are addressed in succession in the code memories, whereby after each step the concerned byte is read into the enciphering generator or the deciphering generator. After eight steps, this gives a total code length of 8 bytes corresponding to 64 bits.

In accordance with the embodiment of FIG. 5, ciphering is done with the thus formed primary code (and auxiliary code) until the data counters 22 and 62 signal the detection of the given maximum data amount $N_{max}$. Then the second address registers 24 and 64 are incremented, and then by eight-fold incrementing of the first registers and subsequent reading out of the memories, the 64 bits of the following primary code are formed, and so on. This embodiment operates analogous to the one illustrated in FIG. 5.

As in the case of the embodiment of FIG. 5, it is also true here that the different counters, pulse generators and so on are preferably implemented by a micro-computer system.

As is evident from the general functional description given in connection with FIG. 1, the address of the primary code is clearly transmitted. In the embodiments of FIGS. 5 and 6, this is actually only the starting address, from which one proceeds with each new initialization. In order to prevent someone who is unauthorized from gaining use from the unscrambled starting address and overlapping of the codes (if for example certain codes or parts of them are known), the transcoders 26 and 66 are connected to the second address counters 24 and 64. These transform the starting address formed by the random number generator 3 according to some regularity and thus conceal their overlapping character.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. An enciphering/deciphering system comprising:
   an enciphering section for transforming unscrambled data into a coded message and having an enciphering generator whose mode of operation is determined by at least one primary secret code, and a first memory with a number of different primary codes stored therein;
   a deciphering section for transforming the coded message back into unscrambled data and having a deciphering generator and a second memory with the same primary codes stored therein;
   means for selecting a primary code from said first memory upon a new initialization of the system, loading it into said enciphering generator, transmitting a storage address of the selected primary code to the deciphering section and, on the basis of the transmitted memory address, reading the primary code out of said second memory and loading it into said deciphering generator; and
   means for producing a randomly determined output signal in the enciphering section, which with each new initialization of the system forms a random selection address for the primary code which is contained in said first and second memories and which is to be newly loaded upon the new initialization, for controlling said code selecting and loading means.

2. The system of claim 1, wherein the operation of the enciphering and the deciphering generators is controlled according to the selected primary code and by a second, random code, said enciphering section including a random number generator for producing said second code, wherein said random number generator comprises said means for producing a randomly determined output signal.

3. The system of claims 1 or 2, wherein said enciphering and deciphering sections each include incrementing means which, after transmission of a given amount of data, automatically effect systematic selection and loading of a new code from said first and second memories respectively into said enciphering or deciphering generators without transmission of the storage address of the newly selected primary code.

4. The system according to claims 1 or 2, wherein said enciphering and deciphering sections include means responsive to at least one of transmission resumption, transmission disturbances, direction change, and transmission or processing of a given maximum amount of data, for effecting a new initialization of the system after detection of at least one of these events.

5. The system of claims 1 or 2, wherein said enciphering section includes transformation means for coding the memory address for the primary code selected by the means for producing a randomly determined output signal, and said deciphering section includes a corresponding transformation means for decoding the storage address.

* * * * *